March 31, 1953 — J. W. COX ET AL — 2,633,295
TWILIGHT COMPUTER
Filed April 10, 1951 — 3 Sheets-Sheet 1
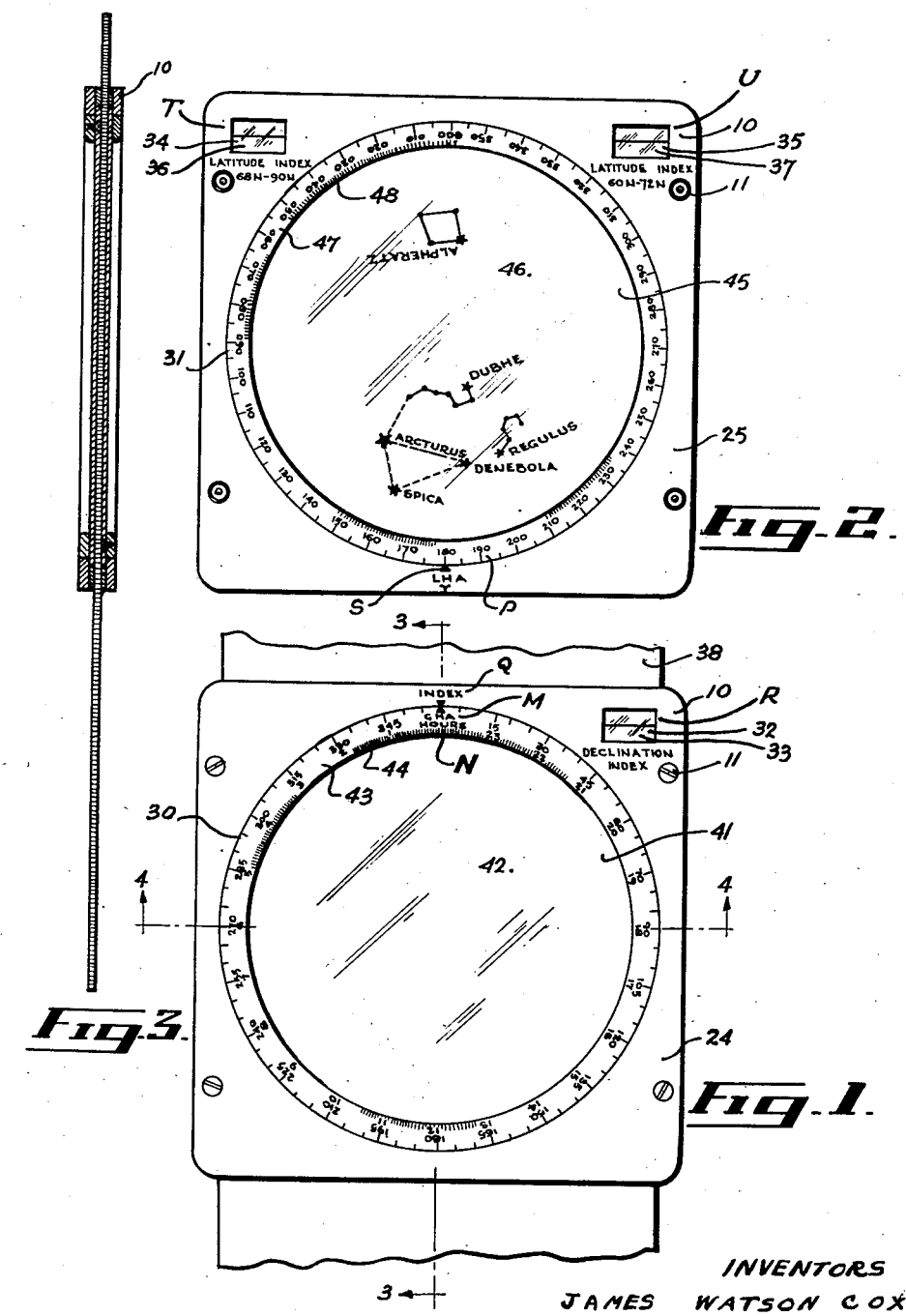
INVENTORS
JAMES WATSON COX
KEITH ROGERS GREENAWAY
By Bailey, Stephens & Huettig
ATTORNEYS March 31, 1953         J. W. COX ET AL         2,633,295
                      TWILIGHT COMPUTER
Filed April 10, 1951                          3 Sheets-Sheet 2
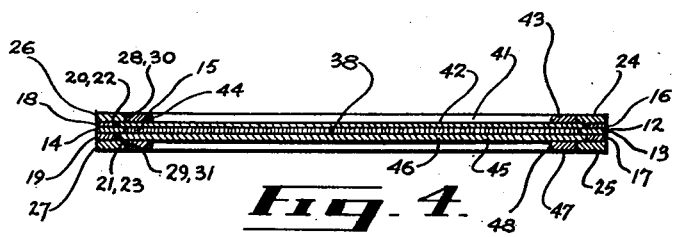
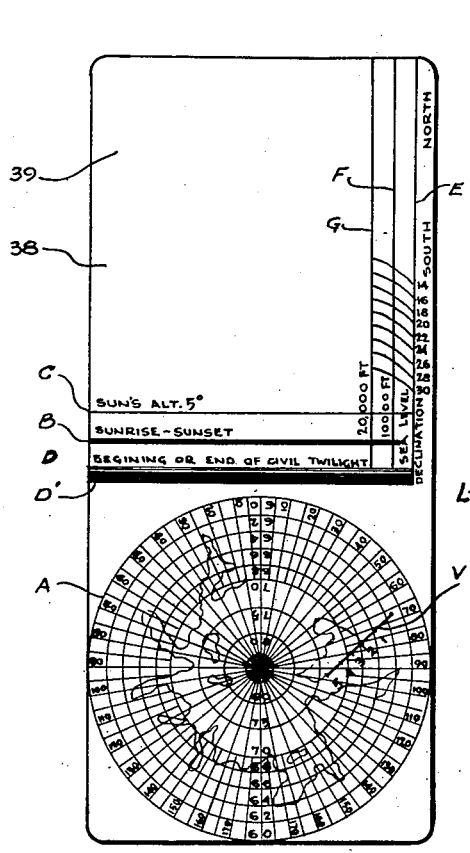
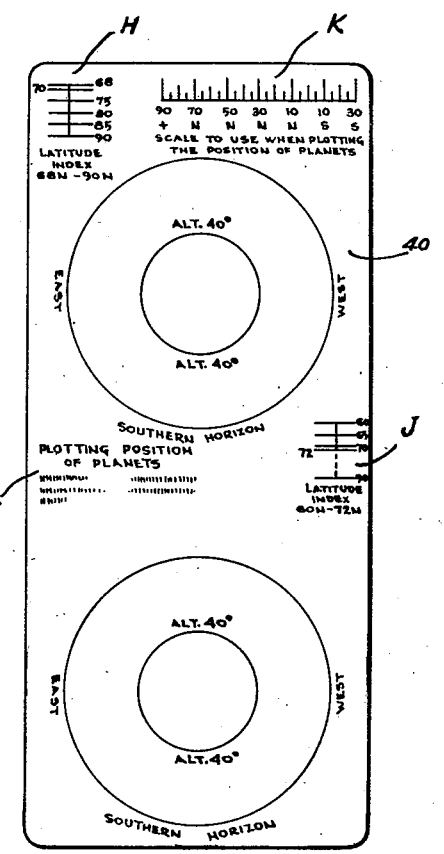
INVENTORS
JAMES WATSON COX
KEITH ROGERS GREENAWAY
By Bailey, Stephens & Huettig
           ATTORNEYS Patented Mar. 31, 1953

2,633,295

UNITED STATES PATENT OFFICE 2,633,295

TWILIGHT COMPUTER

James Watson Cox, Manor Park, Ontario, and Keith Rogers Greenaway, Ottawa, Ontario, Canada, assignors to His Majesty The King in the right of Canada as represented by The Department of National Defence, Ottawa, Ontario, Canada Application April 10, 1951, Serial No. 221,806
In Canada June 16, 1950

3 Claims. (Cl. 235—61)

This invention contemplates a device for facilitating aerial polar navigation and which aids in the determination of the solar lighting conditions during the flight.

The use of long-range fast aircraft in the polar regions has made prominent many problems in navigation which are not of great importance in more settled regions farther south. In particular the absence of electronic aids and the failure of the magnetic compass over large areas renders celestial navigation over land even more essential than formerly. However, celestial navigation has its own difficulties peculiar to the north, and not the least of these is the occurrence of long periods of twilight when neither the sun nor the stars can be used. These long periods of twilight occur on the ground near the beginning and end of the periods of prolonged daylight, and could easily be ascertained from tables if these were published in the almanacs beyond 73° N. (in the Nautical Almanac, the Air Almanac only goes up to 72° N.). Numerous graphical means already exist (e. g. the curves in the American Air Almanac). Aerial navigation encounters a further difficulty, not easily resolved with tables which can only deal with local solar time. The length of a degree of longitude decreases rapidly toward the poles (being proportional to the cosine of the latitude) and this, together with the speed of modern aircraft, makes it easily possible on a westward flight to prolong the twilight period very greatly. In the higher latitudes it is possible to keep up with the apparent sun, so that local solar time for the aircraft remains constant, or even to go faster than the sun, in which case the sun will rise in the west.

During these long twilight periods there may be no navigational means of any sort available, and aircraft are believed to have been lost as a result of this inability to navigate. When flight planning one will, therefore, wish to avoid twilight; this invention contemplates a simple device for calculating how any proposed flight will be affected. Since the motion of the aircraft is allowed for, it is more comprehensive than a set of tables.

It is assumed that the question of twilight will arise during flight planning after the main details of the route have been chosen, so that the probable position at any time after take-off is known. It is desired to find whether twilight will be encountered and whether it can be avoided by a suitable choice of take-off time.

The problem can obviously be solved by quite straightforward means. The local solar time of arrival at each point of the route will be known, and reference to tables, if they existed, would enable twilight to be found. However, this process is laborious, and must be repeated for each possible take-off time. Moreover, it is very difficult to estimate the effect of being off track.

This invention contemplates a device which is designed to facilitate the calculations of the relative positions of the twilight band and a proposed aircraft route with a given take-off time and location as outlined herebefore and designed to meet the requirements of utility, serviceability and endurance under the rigours of arctic flying conditions. The invention is further designed to indicate which stellar bodies may be observed and what their G. H. A. will be during flight.

The labour arises from compounding the speed of the aircraft with the speed of the apparent sun, since it is necessary to compare the motion of the aircraft with the position of the sunset-sunrise line. In the use of this invention the problem is solved by adopting what is essentially the point of view of an observer in outer space, not connected with the earth. To such an observer the sunset-sunrise line will, during periods of a day or so, appear essentially fixed on the earth's disc, and aircraft motions will largely consist of a steady drift to the east at a rate of fifteen degrees per hour, together with the aircraft motion relative to the earth's surface. We shall adopt here a graphical method of showing this motion, and the essential simplification comes from the fact that the sunset-sunrise line then depends only on the solar declination and the height of the aircraft and can be drawn in advance.

This invention incorporates a chart of any type in which the parallels of latitude are concentric circles or parallel straight lines and the meridians are evenly spaced. In the embodiment described below, circles rather than straight lines are used but the expansion of the present principle to an instrument using straight lines will be evident to anyone acquainted with the art of graphical computation. The small circle along which the sun has a particular altitude on a given day will then move fifteen degrees per hour in longitude over the chart, preserving the same shape (apart from the small diurnal motion in declination). It is, therefore, possible to have the sunset line predrawn and to adjust it for local time. To allow for the aircraft motion a conventional plot of the aircraft motion is first drawn. The track is then to be deformed by moving each point to the east at a rate of fifteen degrees for each hour from take-off time. This modified track is then the motion as seen by the imaginary observer in space. The sunset-sunrise line and/or the end of twilight line are now inserted on the map in the positions they occupy at the time of take-off. If any part of the modified track lies between these lines, twilight will occur when the aircraft is on the corresponding part of the time track.

This invention is a computer having four principal parts, which are the body, a route and twilight indicating slider, linearly slideable in the body, and twin discs, rotatably slideable in the body, one being disposed on each side of the slider. In a preferred realization of the design, these parts are of plastic construction, but the invention contemplates that they may be made of any suitable material. In succeeding paragraphs reference will be made to plastic construction but this does not restrict the scope of the invention.

The body is of laminated opaque plastic construction having a longitudinal slot formed by the removal of part of the central lamination layer, and on each side of the longitudinal slot, large circular apertures formed by the removal of parts of the laminated layers on each side of the central laminated layer. Three rectangular windows of transparent plastic conveniently situated allow the flight planner to look from the outside of the body onto the slider and make the desired settings thereon. The laminated layers are held together by metal bolts and may also use adhesive.

The slider is a rectangular sheet of plastic material with the desired charts and graphs printed on each side and is adapted to slide in the longitudinal slot of the body.

Each of the twin discs is composed of an annular opaque plastic indicating ring and a circular plotting window secured together, the greater diameter of the indicating ring being less than the diameter of the plotting window and the indicating ring and the window being concentric. Each disc slides non-removably in a circular aperture of the body. A knurled edge on the inner edge of the indicating ring allows for convenient rotation of the disc. The surface of the transparent discs is treated so as to allow pencil marks to be made thereon and to be easily erased when no longer required.

The plastic construction of the computer gives it the required strength while specifically befitting it for the climate in which it is to be used. The plastic may be touched by the bare hand at temperatures in the neighbourhood of —50° F. without the plastic adhering to the hand. If metal or another substance of high heat conductivity were used, the computer would stick to the hand when touched causing tears and burns to the hand on removal, and interfering with the operation of the device. Furthermore it is one of the objects of this invention to use a plastic which is less brittle than metal at very low temperatures so that the computer will be less likely to break if subjected to dropping or other impacts during handling. Also accruing from the low heat conductivity of the plastic construction is the advantage that the relatively sliding parts show less inclination to stick together due to moisture between the parts than would be shown by corresponding parts of metal.

The laminated construction of the body, while giving it good structural qualities, allows for a simple and adequate method of combining the body with the slider and the discs, so that they may perform their functions.

The invention will now be described in detail having reference to the accompanying drawings in which:

Figure 1 is a top view of the body, the slider and one of the twin discs.

Figure 2 is a bottom view of the body and the other of the twin discs.

Figure 3 is a vertical cross section of the computer taken along the line 3—3 of Figure 1.

Figure 4 is a vertical cross section of the computer taken along the line 4—4 of Figure 1.

Figure 5 is a plan view of the slider showing the markings on one side thereof.

Figure 6 is a plan view of the slider showing the markings on the other side thereof.

Figure 7:
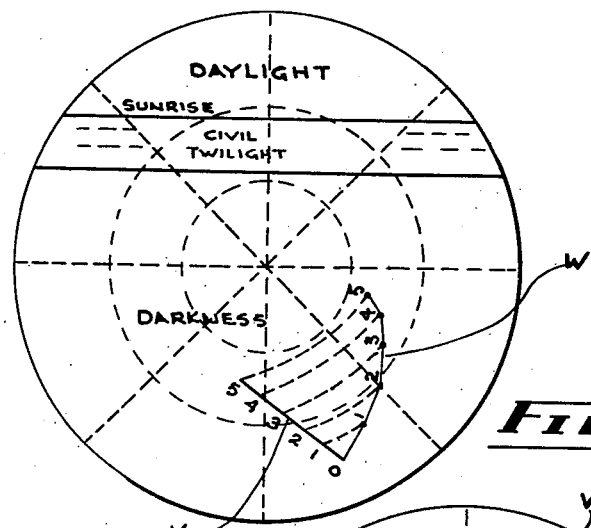
Figures 7, 8 and 9 are diagrammatic sketches to illustrate the operation of the device.

The computer comprises four main parts: a body 10, a slider 38 and twin discs 41 and 45.

The body 10 in its preferred form is constructed of five ply laminated plastic, the five plies being preferably held together by bolts 11 although they may also or alternatively be glued together. The five plies are a centre ply 12 consisting of two longitudinal rectangular portions 13 and 14 which outline the longitudinal slot 15, two middle plies 16 and 17 each having rectangular outer peripheries 18 and 19 respectively and circular inner peripheries 20 and 21 respectively, each circular inner periphery defining the apertures 22 and 23, and two outside plies 24 and 25, each having rectangular outer peripheries 26 and 27 and circular inner peripheries 28 and 29 defining the apertures 30 and 31. The outer ply 24 and middle ply 16 have an aperture 32 extending therethrough in which aperture is inset, setting window 33 of transparent plastic while outer ply 25 and middle ply 17 have apertures 34 and 35 extending therethrough, in which apertures are inset setting windows 36 and 37 respectively, of transparent plastic.

The longitudinal dimensions of plies 12, 16, 17, 24, and 25 are the same while the lateral dimensions of plies 16, 17, 24, and 25 are the same, and are the same as the distance between the outer edges of longitudinal rectangular portions 13 and 14 so that the plies when bolted together have planar end and side walls. The apertures 22 and 23 are respectively of greater diameter but are respectively concentric, with the apertures 30 and 31. With the exception of the windows 33, 36 and 37 the body may be made symmetrical about centre ply 12. The exterior corners of the body are rounded to avoid breakage on dropping.

The slider 38 is made of opaque plastic and has an upper surface 39 and a lower surface 40 and is of such thickness and lateral dimension as to slide loosely in the longitudinal slot 15. The difference in corresponding dimensions of the slider and slot should be small enough to prevent appreciable movement of the slider relative to the body along the said corresponding dimensions. The slider is so oriented that the upper surface 39 is adjacent setting window 33 while lower surface 40 is adjacent setting windows 36 and 37.

Upper disc 41 consists of a circular transparent plotting window 42 and an annular opaque indicating ring 43 both of which are made of plastic. The plotting window 42 and the indicating ring 43 are secured together concentrically with screws and/or adhesive and the plotting window is of greater diameter than the indicating ring. The diameter of the plotting window is just sufficiently less than the diameter of the aperture 22 to allow the plotting window to rotate slidably therein, while the diameter of the indicating ring is just sufficiently less than the diameter of the aperture 30 to allow the indicating ring to rotate slidably therein. The upper disc 41 is thus retained in place by that part of the outer ply 24 which overlaps the plotting window 42. The plotting window 42 has a slightly roughened surface to record the mark of a pencil thereon and the inner periphery 44 of the annular indicating ring is notched to allow easy manual rotation of the disc.

Lower disc 45 consists of a circular transparent plotting window 46 and an annular opaque indicating ring 47 both of which are made of plastic. The plotting window 46 and the indicating ring 47 are secured together concentrically with screws and/or adhesive, and the plotting window is of greater diameter than the indicating ring. The diameter of the plotting window is just sufficiently less than the diameter of the aperture 23 to allow the plotting window to rotate slidably therein, while the diameter of the indicating ring is just sufficiently less than the diameter of the aperture 31 to allow the indicating ring to rotate slidably therein. The lower disc 45 is thus retained in place by that part of the outer ply 25 which overlaps the plotting window 46. The plotting window 46 has a slightly roughened surface to record the mark of a pencil thereon and the inner periphery 48 of the annular indicating ring is notched to allow easy manual rotation of the disc.

The slider 38 thus is longitudinally translatable in the body 10 while the discs 41 and 45 are retained to and slidably rotatable relative to, the body 10.

It is now proposed to discuss the markings on, and operation of, the computer.

The slider 38 has on its upper surface 39 a map A, which in this preferred embodiment of the invention is a polar gnomonic projection but which may be any map in which the parallels of latitude are concentric circles. In Fig. 5 this map extends from the pole to 60° N. latitude but it is not to be considered that this represents any necessary limitation of the range of latitude covered. The top part of the upper surface 39 contains a lateral line B to represent sunset and sunrise, marked as shown, a lateral line C to represent a solar elevation of 5° below which solar elevations are subject to a substantial refraction error, marked as shown, and a lateral line D to represent a solar depression of 6° (which is the conventional beginning or end of civil twilight), marked as shown. The line D is shaded into a line D' which represents a solar depression of 9° where the sky will be growing dark. The area B–D is known as the civil twilight band. For the purposes of specific lighting conditions the line D, the line D' or another line may be used to denote the beginning or end of twilight and the area between B and the line used will hereinafter be called the "twilight band" for the purposes of description.

The top part of the upper surface 39 of the slider contains a longitudinal scale E of solar declination marked as shown, the markings on the scale and the position of the lateral lines B, C and D being interdependent. In order to allow for the variation of the elevation of the sun due to the altitude of the aircraft, the declination scale is displaced an appropriate amount and parallel to line E are provided lines F and G corresponding to height 0, 10,000 and 20,000 feet, and marked as shown. For intermediate heights the displaced scale permits of interpolation.

Since the solar declination depends (within the useful limits of accuracy) only on the date, and is the same for the same date every year, the declination scale could, if required, be replaced by a date scale, or this scale could be added. In order to use this computer with other heavenly bodies besides the sun the declination scale is retained.

In order to determine which of the stellar bodies will be available during a trip, and what their orientation will be, the lower surface 40 and disc 45 are combined to form a high latitude planisphere. For this purpose two skies are represented on the back of the slider; one for latitudes from the pole to 68° N., the other from 72° N. to 60° N., and an altitude of 40° is provided in each sky and marked as shown. For each sky, latitude index scales H and J are provided one on each side of the slider and a planet plotting scale K is provided. Directions L for plotting the position of the planets are also printed on the surface 40 as shown.

On the indicating ring 43 of the upper disc 41 is provided a G. H. A. scale M, and an hours scale N, as shown. It is to be noted that the relation between the G. H. A. scale and the hours scale is not the same as the usual relation between the hour angle of the mean sun and mean solar time. Therefore the hours scale should not be used for purposes other than that for which it is intended. On the indicating ring 47 of the lower disc 45 is provided an L. H. A. Aries scale P as shown. On the indicating window 46 are plotted in white or any other distinguishing colour the "navigation stars" most frequently used north of latitude 60° (see Figure 2). Because of the necessity of using a wide range of celestial latitude (90° N. to 27° S.) the window is scaled according to an azimuth equidistant projection and the stars are plotted with reference to the First Point of Aries. The sidereal hour angle is indicated every 5° on the indicating ring 47. On the outer ply 24 is provided an index Q as shown, to allow the proper adjustment of G. H. A. scale M or hours scale N of indicating ring 43, for computation purposes. Also on outer ply 24 and adjacent aperture 32 are words as shown while on setting window 33 is marked a transverse line R against which is set the desired declination value by translation of the slider 38 until the calculated value of the declination read on the scales E, F or G is directly below the line R. On the outer ply 25 is provided an index S as shown to allow the proper adjustment of the L. H. A. Aries scale P. Also on outer ply 25 and adjacent aperture 34 are words as shown while on the setting window 36 is a transverse line T to facilitate the making of an accurate scale setting of the latitude scale H. Adjacent aperture 35 are words as shown while on the setting window 37 is a transverse line U to facilitate the making of an accurate scale setting of the latitude scale J.

Figure 8:
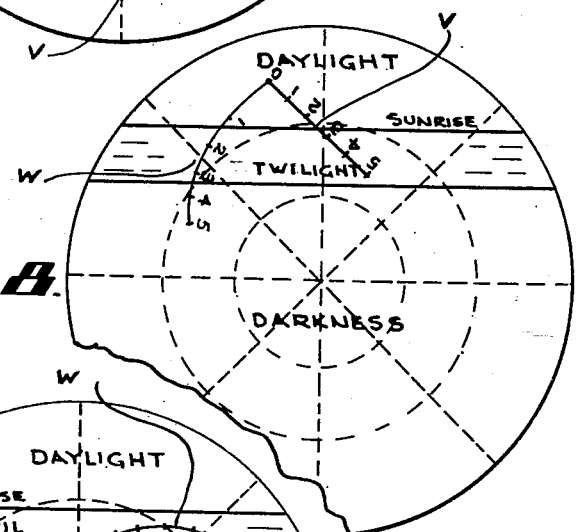
Figure 9:
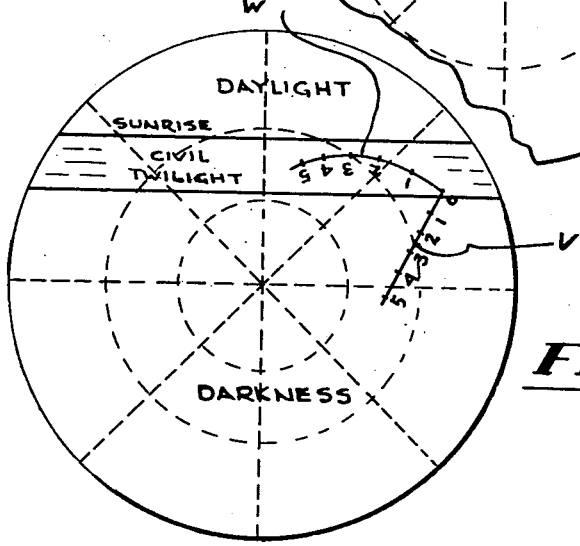

The method of operation of the computer in order to calculate the relation of the twilight band to the flight track is as follows: The flight is assumed to be from Frobisher (63° 50' N., 68° 50' W.) to Resolute (74° 41' N., 94° 55' W.) along a great circle track and is therefore represented by the straight line V drawn on the map A (see Figure 5). The flight is assumed to take five hours and the positions at the end of each whole hour after take-off from Frobisher is marked. (Any convenient time interval may be taken and the length of the time interval will depend on the speed of the aircraft but for convenience in this example, hour intervals are used.) To the observer on the earth's axis, but removed from the earth, the aircraft will appear to move round the pole at fifteen degrees per hour, in addition to its motion over the earth's surface. The track as seen by this observer is, therefore, obtained by displacing the actual track on the earth at this rate. This is done as indicated in Figures 7, 8 or 9. The slider 38 with the map marked with the flight track V, and with the flight track marked with the positions at successive hours after take-off is inserted in the longitudinal slot 15 until the pole on the map coincides with the centre of the rotatable upper disc 41. The disc 41 is now rotated so that the zero hour and zero degree point on scales M and N respectively coincide with index Q. The line V is shown on Figures 7, 8 and 9 as seen through the transparent plotting window 42 of the disc 41 and attention is now directed to those figures. In order to compound the aircraft motion relative to the earth and the earth's motion relative to the observer the take-off point is traced through onto the window 42 with the disc 41 in the position described above. The disc 41 is then rotated until the one hour point on the scale M coincides with the index Q and the "one-hour" (after take-off) point on the line V is traced through onto the window 42. This process is repeated for each subsequent hour, that is the disc is rotated so that a whole number of hours comes to the index and the point on the flight track reached after this number of hours is traced through onto the disc. The traced points joined by a smooth curve drawn on the window 42 form a transformed track W as shown in Figures 7, 8 and 9. The next step is the simple computation of twilight. The slider is moved until the solar declination for that day coincides with the transverse line R on the setting window 33, and is then in the correct position relative to the pole. The height is allowed for by using the correct scale E, F, or G or interpolating. To determine twilight conditions corresponding to a certain time of take-off, the upper disc 41 is turned until the value of the G. H. A. of the sun at the time of take-off as indicated on the G. H. A. scale M coincides with index Q. The transformed track is then in the correct position to indicate the relative position of the flight track and the twilight band during flight. The relative position of the flight track to all lines, e. g. lines B (sunset-sunrise), C (solar elevation 5°) and D (solar depression 6°) are automatically shown.

The transformed track W is shown in Figures 7, 8 and 9 in its correct relationship to the sunrise-sunset line B and the twilight band where the flight conditions for three possible take-off times at Frobisher are shown. Figure 7 shows the conditions for a take-off time of 0600 G. M. T. and it is seen that the transformed track is entirely in the darkness and the whole flight will be at night. Figure 8 shows the conditions for the flight if take-off time is 1800 G. M. T. on the same day in daylight. It is seen that the sun will set on this flight one hour, 20 minutes after take-off, at 1920 G. M. T. and twilight will end three hours, 50 minutes after take-off at 2150 G. M. T. Figure 9 shows the conditions if the flight is begun at 1230 G. M. T. on the same date. This flight would take place entirely in twilight.

Any proposed flight entailing many tracks may be dealt with in the same way, and if desired, allowance can also be made for stopovers of known duration at particular points.

Although designed for the sun the elevation of any heavenly body may be determined, if its declination and G. H. A. are known. The computer is used therefore to determine what heavenly bodies will be above the horizon, and which will have a sufficient elevation to permit of elevational measurement without undue refractive error. For this purpose the declination scales E, F and G have been extended to 30° S. For stars and planets the computation is as exact as that of the sun. To correct for the moon, allowance should be made for the fact that the G. H. A. changes rather less than 15° per hour, but the error introduced by neglecting this on a flight of a few hours' duration will not be important.

To assist further in the navigator's use of the stars and other heavenly bodies other than the sun, a high latitude planisphere is provided on the lower surface of the computer and it is for this purpose that the stars are provided on plotting window 46, the L. H. A. scale P with 000° coinciding with the First Point of Aries is provided, and the two skies on the lower surface 40 of the slider and the scales H, J and K are provided.

In order to determine the position of the stars at a given time, rotate the disc until the appropriate L. H. A. Aries is opposite the index. Then move the slider through the holder until the required latitude on either scale H or J coincides with the black line on either setting window 36 or 37 respectively. The stars visible to the observer will be clearly outlined by the white marking of the plotting window 46 against the dark background of the lower surface 40 of the slider. The centre of the sky is the observer's zenith and all of the brighter visible stars will be shown in their proper position.

Provision has been made for plotting the position of the planets and instructions L have been printed on the slider.

Although the high latitude planisphere is useful and the computer has been compactly designed to include it, the calculation of the relative position of the twilight band and the flight track can be carried on without it, so that a computer may be made if desired with only the upper disc 41, body 10 and only utilizing the upper surface 39 of the slider.

It should be noted in planning a flight with this computer, what deviation from the planned track will carry the aircraft into the twilight zone, and the accuracy of the navigation achieved accordingly. Similarly the change in height to carry the aircraft into the twilight zone should be noted and the flight planned to avoid the necessity of climbing into the twilight zone to avoid adverse weather conditions.

If the same route is flown frequently, time can be saved when flight-planning if twilight conditions are precomputed. This can be accomplished quite easily by means of the twilight computer.

The route is drawn on the map on the lower half of the slider, marked off in hourly intervals, and the transformed track plotted as previously explained. The range of times of take-off for a daylight flight or a night flight is noted for the selected declination. Since declination is equivalent to a certain day of the month, the take-off times can be plotted against a 24 hour scale and the day and month of the year. This operation is repeated for the various degrees of declination of the sun, and the times of take-off plotted on the graph. By inspecting this graph, the navigator can note immediately if it is possible to make the flight in either complete daylight or darkness, and, if so, the time of take-off. Since a graph of this type can be used only for one flight-plan time, a series of such graphs are necessary to cover the anticipated range of ground speeds.

There is no difficulty in applying the same computer to the antarctic. A second slider with the declination scale reversed and a map of the antarctic would be required. Also, the rotating disc of the planisphere would have to be replaced with one indicating the navigation stars of the antarctic.

There is nothing essential about the motion of the aircraft. The times of sunset-sunrise and twilight for a fixed point can be determined in the same way, but the replotting process is not necessary. The point considered is traced through onto the disc with the G. H. A. index set to zero; then the slider is set for the sun's declination. The sun will be on the horizon when its G. H. A. is such as to bring the traced-through point to the sunset-sunrise line. Similarly, twilight times can be determined. In doing this it will sometimes be found that as the disc is rotated, the point moves along the sunrise-sunset line, and the exact time at which it cuts is difficult to determine. This corresponds to the actual case in which the sun moves almost parallel to the horizon and the exact time when the upper limit is on the horizon is difficult to determine and likely to be greatly affected by small changes in refraction. This gives a clearer picture of the actual conditions than can be obtained from the conventional tables.

The instructions "L" which are printed on the surface 40 are as follows: 1. From air almanac, extract mean sha & declination of a planet for the appropriate date.

2. Against hour angle scale on star chart, mark mean sha.

3. On above scale, measure distance between + (N pole) and appropriate dec. Plot this distance from the pole (+) along the sha.

This twilight computer has been used for flight planning a number of high latitude flights. In May 1949, the staff and members of No. 1 Specialist Course of the Air Navigation School used this computer for flight-planning their polar trip. It was of great assistance, and was considered by the navigators to be a requirement for safe and accurate planning of arctic flights.

We claim:

1. A computer device comprising a flat rectangular main body having two side faces and four edge faces; a rectangular slit cavity provided through the main body from one edge face to the opposite edge face and intermediate the other two edge faces; a freely-rotatable transparent disc, whose periphery is marked clockwise with an hour-angle scale, and a substantially rectangular window visually connecting the cavity with one side face of the main body; another freely-rotatable transparent disc, whose periphery is marked clockwise with an hour-angle scale, and two other substantially rectangular windows visually connecting the cavity with the other side face of the main body; and a separate flat rectangular slider, which has no positive connection with the main body but is slidable within the cavity, is provided on one face with a chart and a twilight-indicating band for registering under the first-mentioned disc and with a declination index for registering under the first-mentioned window, and is provided on the other face with two charts for registering as required under the second-mentioned disc and with two latitude indexes for registering respectively under the two second-mentioned windows.

2. A computer device comprising a flat rectangular main body having two side faces and four edge faces; a rectangular slit cavity provided through the main body from one edge face to the opposite edge face and intermediate the other two edge faces; a freely-rotatable transparent disc, whose periphery is marked clockwise with an hour-angle scale and anticlockwise with a time scale of 24 hours and whose surface is treated so as readily to be receptive to pencil marks and to allow erasing thereof, and a substantially rectangular window, bearing a straight line marking, visually connecting the cavity with one side face of the main body; another freely-rotatable transparent disc, whose periphery is marked clockwise with an hour-angle scale and which is plotted with heavenly bodies suitable for navigation purposes, and two other substantially rectangular windows, each bearing a straight line marking, visually connecting the cavity with the other side of the main body; and a separate flat rectangular slider which has no positive connection with the main body but is slidable within the cavity, is provided on one face with a gnomonic chart for registering under the first-mentioned disc and with a declination index for registering under the first-mentioned window and with a twilight-indicating band which registers under the first-mentioned disc when the declination index is registered under the first-mentioned window, and is provided on the other face with two altitude charts for registering as required under the second-mentioned disc and with two latitude indexes, corresponding respectively with the two altitude charts, for registering respectively under the two second-mentioned windows.

3. A computer device comprising a flat rectangular main body having two side faces and four edge faces; a rectangular slit cavity provided through the main body from one edge face to the opposite edge face and intermediate the other two edge faces; a freely-rotatable transparent disc, whose periphery is marked clockwise with an hour-angle scale and anti-clockwise with a time scale of 24 hours and whose surface is treated so as readily to be receptive to pencil marks and to allow erasing thereof, and a substantially rectangular window, bearing a straight line marking, visually connecting the cavity with one side face of the main body; another freely-rotatable transparent disc, whose periphery is marked clockwise with a sidereal hour-angle scale and which is plotted with heavenly bodies suitable for navigation purposes, and two other substantially rectangular windows, each bearing a straight line marking visually connecting the cavity with the other side of the main body; and a separate flat rectangular slider which has no positive connection with the main body but is slidable within the cavity, is provided on one face with a gnomonic chart of the North Pole from 60° North for registering under the first-mentioned disc whereby this disc may be plotted with the true course in space and with a declination combined with airplane altitude index for registering under the first-mentioned window and with a twilight-indicating band which registers under the first-mentioned disc when the declination-altitude index is registered under the first-mentioned window whereby the true course plotted is seen in relation to twilight, and is provided on the other face with two heavenly body altitude charts used respectively in conjunction with two latitude indexes, one index giving from 60° North to 72° North and the other index giving from 68° North to 90° North, the registering of an index under one of the two second-mentioned windows automatically registering the corresponding altitude chart under the heavenly bodies plotted on the second-mentioned disc whereby the altitude of these heavenly bodies is shown for any given time.

JAMES WATSON COX.
KEITH ROGERS GREENAWAY.

REFERENCES CITED

The following references are of record in the file of this patent:

UNITED STATES PATENTS

| Number | Name | Date |
|---|---|---|
| 1,405,598 | Kramer | Feb. 7, 1922 |
| 2,007,986 | Sprague | July 16, 1935 |
| 2,517,590 | Mundorff | Aug. 8, 1950 |
| 2,531,932 | Brown | Nov. 28, 1950 |